(12) United States Patent
Pacella et al.

(10) Patent No.: US 9,277,025 B2
(45) Date of Patent: Mar. 1, 2016

(54) DISTRIBUTED CONTENT CACHING

(75) Inventors: Dante John Pacella, Charles Town, WV (US); Mark Douglas Carney, Sterling, VA (US); Harold Jason Schiller, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1014 days.

(21) Appl. No.: 13/194,026

(22) Filed: Jul. 29, 2011

(65) Prior Publication Data

US 2013/0031170 A1    Jan. 31, 2013

(51) Int. Cl.
*H04L 29/08* (2006.01)

(52) U.S. Cl.
CPC ............ *H04L 67/2842* (2013.01); *H04L 67/10* (2013.01); *H04L 67/288* (2013.01)

(58) Field of Classification Search
CPC ............................. H04L 67/10; H04L 67/2842
See application file for complete search history.

(56) References Cited

U.S. PATENT DOCUMENTS

| | | | | |
|---|---|---|---|---|
| 6,813,690 | B1 * | 11/2004 | Lango et al. ................... | 711/118 |
| 2007/0266169 | A1 * | 11/2007 | Chen et al. .................... | 709/231 |
| 2008/0244070 | A1 * | 10/2008 | Kita et al. ..................... | 709/225 |
| 2009/0262741 | A1 * | 10/2009 | Jungck et al. ................. | 370/392 |
| 2010/0146038 | A1 * | 6/2010 | Hajiaghayi et al. ........... | 709/203 |
| 2010/0177680 | A1 * | 7/2010 | Fischer et al. ................ | 370/328 |

* cited by examiner

*Primary Examiner* — Suraj Joshi

(57) ABSTRACT

A content server farm in a host network may be configured to receive a message indicating that content is to be downloaded to a content consumer device in the host network different from a partner network. A first copy of the content is stored at an originating content provider device in the partner network. A path for downloading the first copy of the content from the originating content provider device in the partner network to the content consumer device in the host network includes peering points that connect the host network to the partner network. The content server farm may determine whether a second copy of the content is cached at the content server farm in the host network, acquire the content when the second copy of the content is not cached at the content server farm in the host network, cache the content as the second copy at one or more locations in the content server farm in the host network, and generate indices that correspond to the second copy of the content and the locations at which the second copy of the content is stored.

20 Claims, 7 Drawing Sheets

DISTRIBUTED CONTENT CACHING

BACKGROUND INFORMATION

In recent years, the demand for network bandwidth has been driving the demand for different types of network technology and services. For example, in the United States, the demand for Ethernet services is expected to increase at a compound annual growth rate (CAGR) of over 20%. The demand is projected to exceed $5 billion by 2012. Such growth and increasing demand stem from the need for higher bandwidth for site-to-site and data center connectivity, scalability, performance, and security.

DETAILED DESCRIPTION OF PREFERRED EMBODIMENTS

The following detailed description refers to the accompanying drawings. The same reference numbers in different drawings may identify the same or similar elements.

Figure 1:
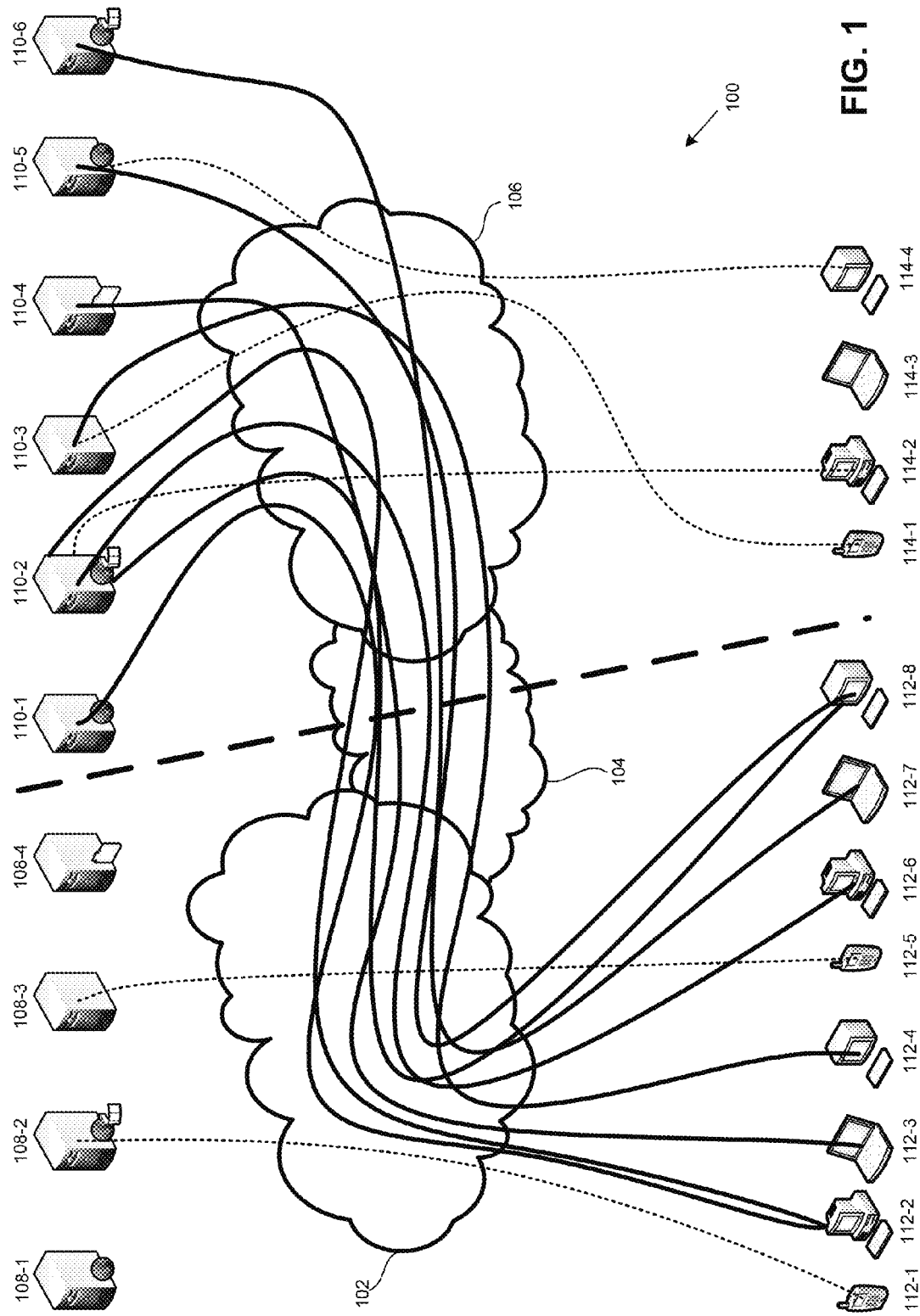
FIG. 1 illustrates exemplary network traffic through an exemplary network according to one implementation.

As described herein, a system may cache content that passes through one or more networks. By caching the content and providing the content upon demand, the system may reduce the overall network traffic and relieve stress on network elements. FIG. 1 illustrates traffic through an exemplary network 100 according to one implementation. Network 100 may include the Internet, an intranet, a local area network (LAN), a wide area network (WAN), a metropolitan area network (MAN), a cellular network, a public switched telephone network (PSTN), an optical network, an ad hoc network, any other network, or a combination of one or more networks.

As shown, network 100 may also include a host network 102, peering points 104, partner network 106, originating content provider (OCP) user devices 108-1 through 108-4 (collectively "OCP user devices 108" and individually "OCP user device 108"), OCP user devices 110-1 through 110-6 (collectively "OCP user devices 110" and individually "OCP user device 110"), content consumer (CC) user devices 112-1 through 112-8 (collectively "CC user devices 112" and individually "CC user device 112"), and CC user devices 114-1 through 114-4 (collectively "CC user devices 114" and individually "CC user device 114").

Depending on the implementation, network 100 may include additional, fewer, different, or a different arrangement of networks and devices than those illustrated or described above. For example, network 100 may include thousands or millions of user devices, tens or hundreds, or thousands of networks, etc.

Host network 102 may provide network services to OCP user devices 108 and CC user devices 112 (e.g., provide connections to the interact or another network). In providing the services, host network 102 may connect OCP user devices 108 to CC user devices 112 and to CC user devices 114 via peering points 104 and partner network 106. The services may include, for example, network connectivity (e.g., wireless or wire-line connectivity to other devices or to the Internet), web hosting, data services, cloud services, telephone services, etc.

Figure 2:
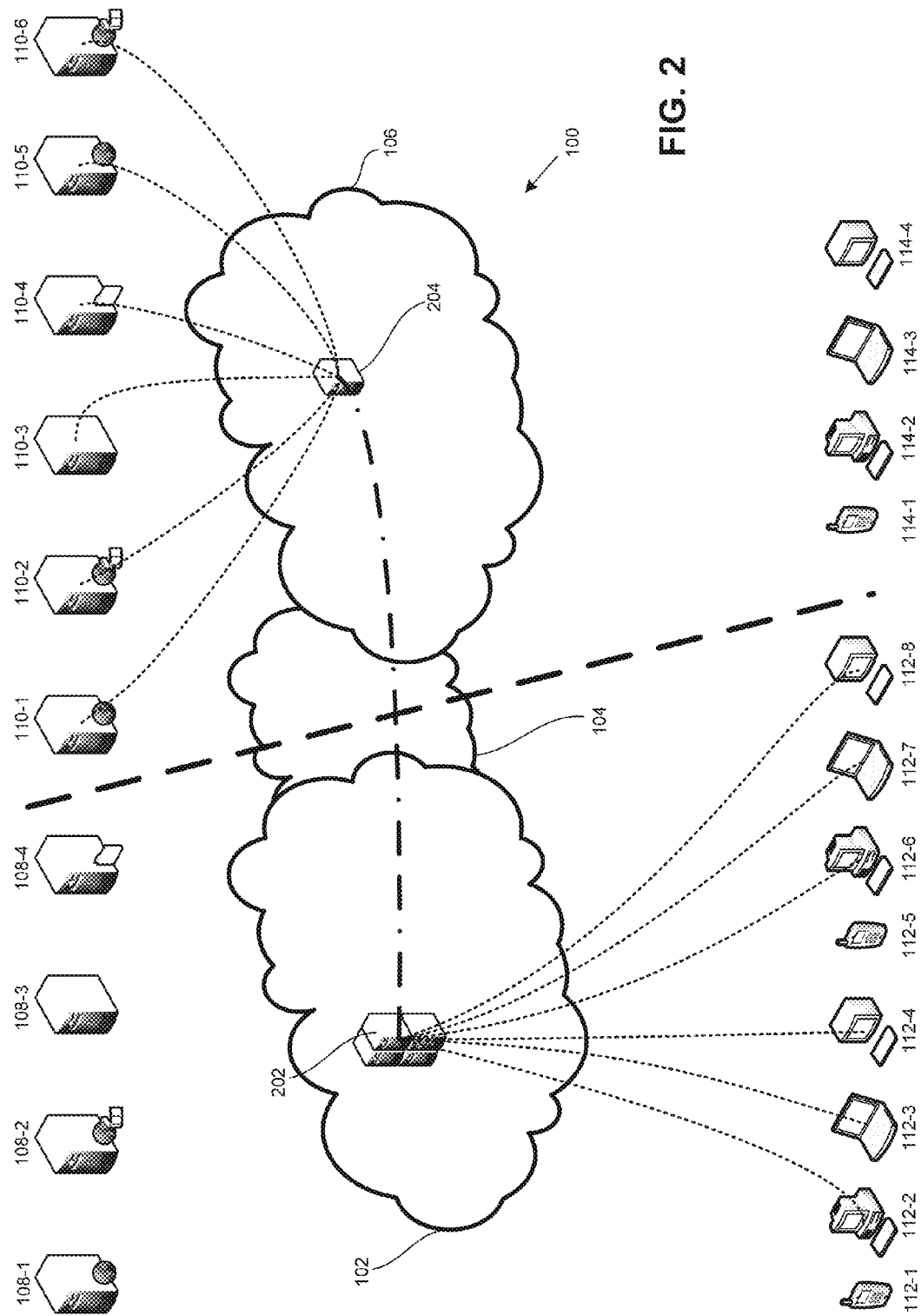
FIG. 2 illustrates the network of FIG. 1 according to another implementation.

Peering points 104 may include network locations nodes) here two or more networks exchange traffic. In FIG. 2, host network 102 and partner network 106 may exchange traffic via peering points 104. Because peering points 104 interconnect different networks, peering points 104 may support large bandwidths.

Partner network 106 may provide network services to OCP user devices 110 and CC user devices 114. In providing the services, partner network 106 may connect OCP user devices 110 to CC user devices 114 and to CC user devices 112 via peering points 104 and host network 102.

In FIG. 1, communication between OCP user devices 108 and CC user devices 112 are shown in dotted lines. The traffic between OCP user devices 108 and CC user devices 112 may be distributed over different elements of network 102. This may reduce the chance of congestion at a single or few network nodes. FIG. 1 also shows communication between OCP user devices 110 and CC user devices 114 in dotted lines. The traffic between OCP user devices 110 and CC user devices 114 may be distributed over different elements of network 106. This may reduce the chance that high traffic stresses a single or few network nodes.

In FIG. 1, communication between OCP user devices 110 and CC user devices 112 are shown in solid lines. The traffic between OCP user devices 110 and CC user devices 112 must pass through peering points 104, which may sometimes be unable to handle high traffic that the communication demands. Network 100 may alleviate or eliminate such stress placed on peering points 104, via one or more content server farms and other content server farm-related devices and/or components (not shown in FIG. 1).

FIG. 2 illustrates network 100 according to another implementation. In this implementation, host network 102 includes content server farm 202 and partner network 106 includes one or more of content verification server device 204. Content server farm 202 caches or stores content from OCP user devices 110 and may provide the content to one or more CC user devices 112.

In acquiring the content, content server farm 202 may need to receive network traffic that flows from OCP user devices 110 over peering points 104. Once the content is acquired by and cached at content server farm 202, content server farm 202 may provide the content to CC user devices 112, as indicated by dotted lines from content server farm 202 to CC user devices 112. When content server farm 202 provides the content to CC user devices 112, the content does not need to pass through peering points 104.

Verification server device 204 determines whether content, obtained originally from OCP user devices 110, that is stored in content server farm 202 is up-to-date. To verify that the content is up-to-date, verification server device 204 may contact each of OCP user devices 110. If a piece of the content is not up-to-date, verification server device 204 may obtain the updated piece from one or more of OCP user devices 110, and provide the updated piece to content server farm 202. Alternatively, verification server device 204 may alert content server farm 202 that the piece is not up-to-date, and content server farm 202 may obtain the updated piece from OCP user devices 110. In another implementation, the verification server device 204 may notify the content server farm 202 that a piece of content is not up to date and may provide either a full copy of the piece or instructions alter the old copy to match the new data across the communications channel between these devices. The instructions may indicate offsets at which to add, delete and/or alter data, replacement values for these offsets, information used to truncate a file to anew size, etc. In another implementation, updates to content in one content server farm 202 may be replicated to another content server farm 202.

In FIG. 2, when CC user devices 112 need to obtain content at OCP user devices 110 and the content is cached at content server farm 202, CC user devices 112 may obtain the content from content server farm 202 rather than from OCP user devices 110. Accordingly, in FIG. 2, network traffic, a portion of which corresponds to the content, that passes through peering points 104 may be less than the corresponding traffic in FIG. 1. Peering points 104 in FIG. 2 may be required to handle less traffic than peering points 104 in FIG. 1, and accordingly, peering points 104 in FIG. 2 may be equipped or implemented with less expensive, lower bandwidth devices and/or components (e.g., lower bandwidth optical cables) than peering points 104 in FIG. 1. Furthermore, for CC user devices 112, downloading content from content server farm 202 may be faster than downloading content from OCP user devices 110, as the content would travel fewer hops and/or shorter physical distance.

Figure 3:
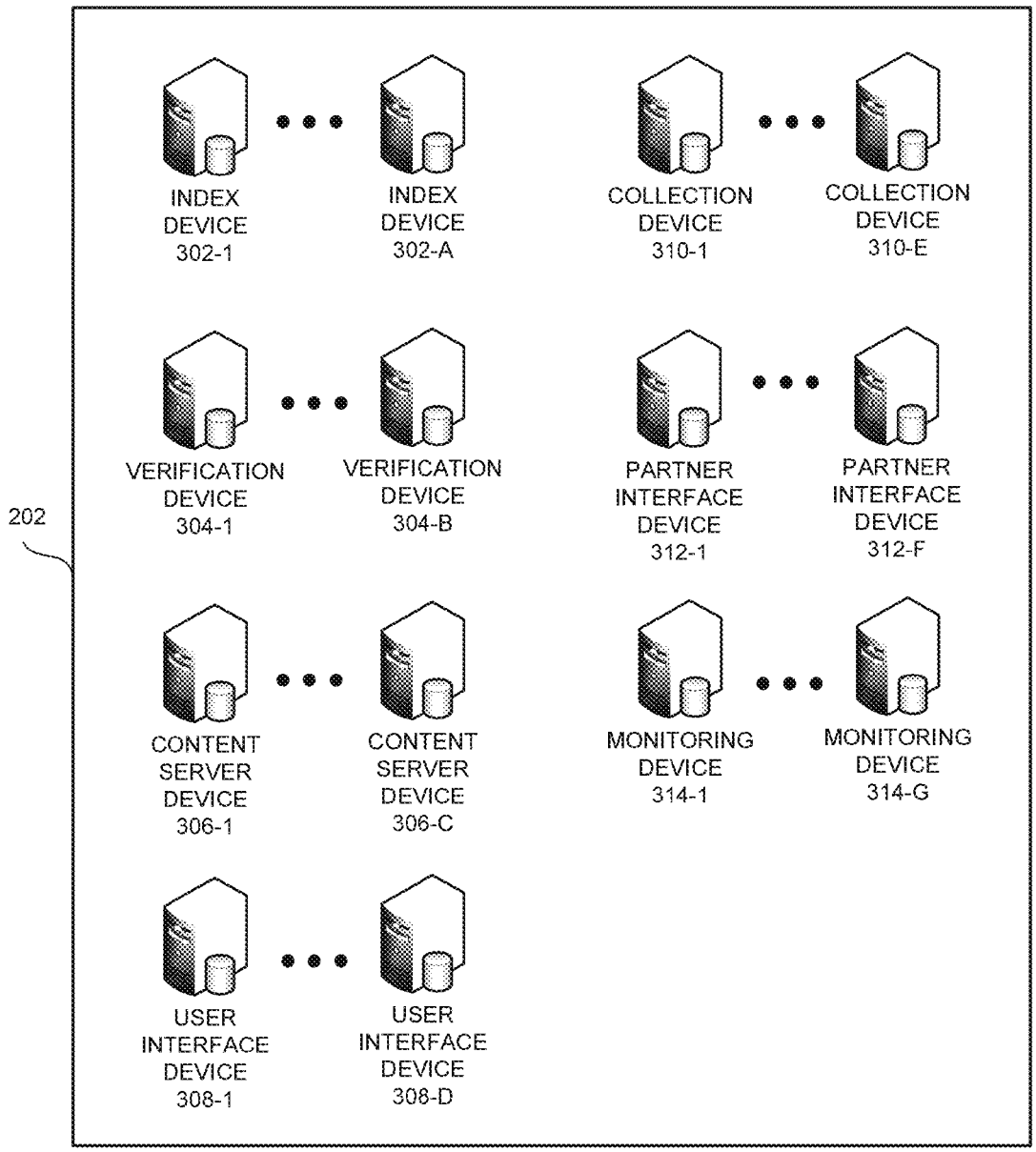
FIG. 3 shows exemplary devices of the content server farm of FIG. 2.

FIG. 3 shows exemplary devices of content server farm 202. As shown, content server farm 202 may include index devices 302-1 through 302-A (collectively "index devices 302" and individually "index device 302"), verification devices 304-1 through 304-B (collectively "verification devices 304" and individually "verification device 304"), content server devices 306-1 through 306-C (collectively "content server devices 306" and individually "content server device 306"), user interface devices 308-1 through 308-D (collectively "user interface devices 308" and individually "user interface device 308"), collection devices 310-1 through 310-E (collectively "collection devices 310" and individually "collection device 310"), partner interface devices 312-1 through 312-F (collectively "partner interface devices 312" and individually "partner interface device 312"), and monitoring devices 314-1 through 314-G (collectively "monitoring devices 314" and individually "monitoring device 314"). A, B, C, D, E, F, and G in the labels of FIG. 3 correspond to an integer greater than or equal to one.

Depending on the implementation, content server farm 202 may include additional, fewer, or different devices than those illustrated in FIG. 3. In some implementations, functionalities of two or more devices of FIG. 3 may be implemented in a single device. In other implementations, functionalities of one device may be distributed over two or more devices.

Index device 302 may store one or more indices of content stored at content server farm 202. When content server device 306 downloads and stores content from OCP user device 108/110, content server device 306 may generate one or more indices that identify locations at which the content is stored (e.g., addresses of databases and/or devices that store the content). Once an index device 302 receives a set of indices for a particular piece of content, index device 302 may notify other index devices 302 of the set of indices, until the index databases in all of index devices in content server farm 202 are synchronized. In notifying other index devices 302, the index device 302 may send messages under a particular signaling protocol.

When CC user device 112 is to download a particular piece of content from content server farm 202, CC user device 112 may send a query to one of index devices 302, identifying the particular piece of content. Upon receipt of the query, index device 302 may perform a lookup in its index database and determine at which content server device 306 the identified piece of content is stored. Furthermore, in response to the query, index device 302 may send, to CC user device 112, a message that identifies content server device 306 or a user interface device 308 via which the piece of content can be downloaded from content server farm 202. Index device 302 may also perform lookups in its index database in response to queries from other devices, such as verification device 304, user interface device 308, partner interface device 312, etc.

Verification device 304 may check, periodically or upon receipt of a demand from content server device 306, staleness of content stored at content server device 306. In some implementations, verification device 304 may be included no only in content server farm 202 in host network 102, but also in partner network 106. Assuming that verification device 304 is in partner network 106, to initiate a staleness check, verification device 304 may send a query to index device 302 in content server farm 202, requesting a list of cached contents provided by OCP user devices 110 in partner network 106. For each piece of content in the list provided by index device 302, verification device 304 may generate a checksum, perform data sampling of the content associated with the item, compare the sample against a sample of the content from OCP user devices 110, etc., to verify whether the content is up-to-date. Verification device 304 may send a result of the verification to content server device 306. In turn, content server device 306 which may use the result to obtain an up-to-date copy of the content.

Verification device 304 may facilitate bandwidth savings by aggregating staleness checks for multiple pieces of content in a local network. To achieve greater efficiency, verification devices 304 may be configured to stream data across peering points 104 using optimized data transfer protocols. This may reduce the overhead associated with individually communicating staleness checks to OCP user devices 110 for each piece of content.

For each staleness check, verification device 304 may determine whether each piece of content cached at content server farm 202 is available to be downloaded to CC user device 112 from OCP user device 110. For example, in some implementations, when an original piece of content is not available for direct download from the source (e.g., a OCP user device 110), verification device 304 may indicate the unavailability in its message(s) to content server device 306. If the original content is not available from the source, content server device 306 may prevent or no longer allow CC user devices 112 from downloading the piece of content (e.g., place the piece of content in "hidden" mode). Conversely, when the original piece of content becomes available for downloads at OCP user device 110, verification device 304 may notify content server device 306, to allow the piece of content to be downloaded by CC user devices 112. In other implementations, verification device 304 may receive a message, from a OCP user device 110, that indicates whether content server device 306 may continue to avail the piece of content to CC user devices 112.

For some of content, verification device 304 may not determine whether the pieces are up-to-date. For example, some content may be in its "final" form. Such content may be indefinitely retained in content server device 306. In another example, OCP user devices 110 may distribute content with an expiration date. For such content, verification device 304 may not need to determine whether they are up-to-date. When the expiration date/time passes, content server device 306 may remove the content from its database.

Figure 4:
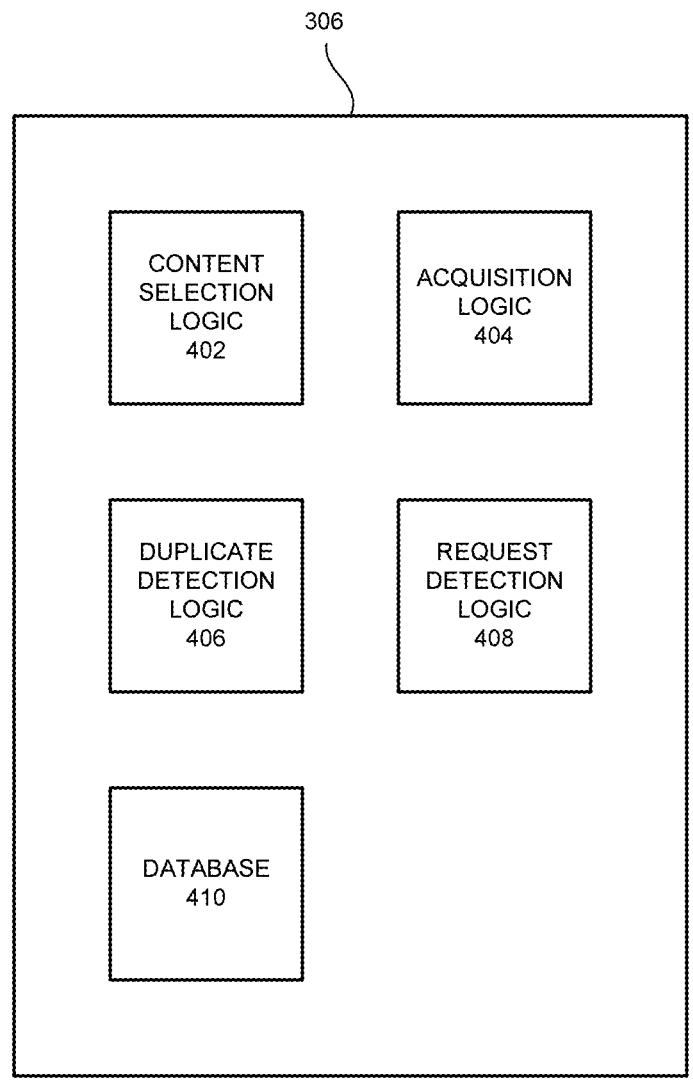
FIG. 4 is a block diagram of exemplary functional components of an exemplary content server device of FIG. 3.

Content server device 306 may determine and select contents to download from OCP user devices 110, store the selected contents, and stream the contents from its database to CC user devices 112, FIG. 4 is a block diagram of exemplary functional components of content server device 306. As shown, content server device 306 may include content selection logic 402, acquisition logic 404, duplicate detection logic 406, request detection logic 408, and a database 410. Depending on the implementation, content server device 306 may include additional, fewer, different, or a different arrangement of components than those illustrated in FIG. 4. For example, in a different implementation, two of the components may be merged into one component. In another implementation, one component of content server device 306 may be implemented as two or more components.

Content selection logic 402 may determine which pieces of content to mirror or store in database 412 in a number of ways. For example, content selection logic 402 may determine whether to mirror/store a piece of content based on an address of the content source (e.g., OCP user device 110), a content identifier (e.g., a name of the piece of content (e.g. names of popular operating systems, applications, YouTube top 100 videos, etc.), etc. In another example, content selection logic 402 may determine which content to download based on the size of content, frequency of downloading the content, etc.

In yet another example, content selection logic 402 may receive a request from OCP user device 110 to cache or mirror specific content (e.g., via a graphical user interface (GUI), browser, etc.). In this example, content selection logic 402 may assign a higher confidence rating to OCP user devices 110 that typically perform early requests for files commonly later requested by CC user devices 112. If there is a limited caching space or scheduling conflicts for caching contents at content server farm 202, contents from OCP user devices 110 with higher confidence rating may be cached before contents with lower confidence ratings. In another example, devices with a higher confidence rating may define or be used to define patterns of requests (e.g. they commonly request file X then file Y then file Z) such that when such a user requests file X, files Y and Z are also inserted into the request queue.

In still yet another example, content selection logic 402 may receive a request from a partner device (not shown) (e.g., a device operated by a partner that owns partner network 106) to cache/store content. For example, assume that a partner releases a new game, and the partner sends a message to content selection logic 402, requesting content server farm 202 to encrypt the game, cache the encrypted game, and distribute the encrypted game. By having content server device 306 distribute the game to the partner's customers (e.g., one or more CC user devices 112), the partner may save bandwidth and/or cost. Furthermore, because content server farm 202 supports many types of downloading protocol/techniques (e.g., multicast stream, direct-on-net downloads, torrent-style distribution, etc.), the partner's customer may be able to download the content in a way that is most convenient for the customer. This may increase the customer satisfaction while leaving the partner in control of when users may access the game content through partner's management of decryption keys.

Acquisition logic 404 may obtain initial copies of media (e.g., content) for content server device 306 and/or content server farm 202. Acquisition logic 404 may obtain the copies in a number of ways.

For example, acquisition logic 404 may detect and harvest content that OCP user devices 110 stream to CC user devices 112. More specifically, for example, assume that the users of the OCP user device 110 and CC user device 112 have signed off on an agreement (e.g., with an operator of host network 102) to allow content server farm 202 to cache content streamed from the OCP user device 110 to CC user device 112. In addition, assume that acquisition logic 404 receives a message, from monitoring device 314, that particular content is streaming from OCP user device 110 to CC user device 112. Upon receipt of the message, acquisition logic 404 may request monitoring device 314 to send a copy of the streaming content. Content server device 306 may cache the content upon its receipt.

In another example, acquisition logic 404 may obtain initial copies through direct uploads and/or downloads from OCP user device 110. More specifically, in the case of uploading, OCP user device 108/110 or a partner device (e.g., an operator of network 102) may directly upload content to content server device 306 via acquisition logic 404. In some implementations, the partner device may be allowed to upload content in exchange for the mutual benefit of bandwidth savings or a small charge, for example, if content server farm 202 service is marketed as a premium option to an originating content provider. In such a case, the originating content provider's users may be given preferred access to the content. In the case of downloading, acquisition logic 404 may initiate a download of an initial copy of content from a particular OCP user devices 110 and cache the content.

In yet another example, acquisition logic 404 may obtain initial copies of media by visiting and downloading content from selected distribution sites (e.g., website). This may be possible when host network 102 is in an arrangement, with a site, in which content server farm 202 mirrors content at the site (e.g., a site for an open source project (e.g., Linux distribution site, FreeBSD site, Open Office site, Perl site, etc.)). Such an arrangement may gain favor with a user base associated with the site. Once the initial copy is downloaded from the site, acquisition logic 404 may periodically synchronize the copy with the content at the site.

In still yet another example, acquisition logic 404 may join a cluster (e.g., a peer-to-peer cluster) that reties on peer-to-peer sharing of previously acquired data to reduce load on initial peers (e.g., BitTorrent cluster). In one implementation, acquisition logic 404 in two or more content server devices 306 having multiple IP addresses may join the cluster to download different pieces of content. Acquisition logic 404 in different content server devices 306 may coordinate with one another to internally share information and to rapidly complete downloading the content. In one implementation, while acquisition logic 404 is obtaining content from the cluster, requests from CC user device 112 may be directed to different network addresses of content server devices 306. Accordingly, CC user devices 112 may obtain the content directly from content server devices 306 in host network 102, or optionally, connect to other content server devices in other networks. CC user devices 110 may experience high download speeds from seed nodes (e.g., content server devices 306 that provide the piece of content) in host network 102 once content server devices 306 have at least one full copy of the content.

In some implementations, acquisition logic 404 may obtain a local image of content by using a combination of methods described above. When downloading content, acquisition logic 404 may factor in current imbalances in network traffic, with respect to partner network 106 or other peer networks, to determine which of multiple sources of the content would be most cost efficient, time efficient or bandwidth efficient for downloading the content for caching/mirroring.

In obtaining a copy of content OCP user devices 110, acquisition logic 404 may or may not protect the copy against copyright infringement or unauthorized access. Toward this end, acquisition logic 404 may retain a database of segmentation flags for different contents or sources of the contents. Depending on the value of the segmentation flag associated with content being downloaded, acquisition logic may segment the content and/or encrypt each segment. Acquisition logic 404 may store the encrypted segments in non-sequential or non-contiguous storage locations. For example, acquisition logic 404 may store different portions of the content in different records in database 410. In another example, acquisition logic 404 may store the portions in different content server devices 306. In either case, acquisition logic may indicate the locations of the different portions in the index database in index device 302. In some instances, a segmentation flag for content may not be set (e.g., in cases where download/upload performance is critical). In these instances, acquisition logic 404 may store a copy of the content in contiguous storage locations or in one content server device 306, as a single file.

Duplicate detection logic 406 may detect redundant copies of content that may be downloaded to content server devices 306. When several CC user devices 110 attempt to download the same content from multiple sources (e.g., multiple OCP user devices 110), it is possible for content server farm 202 to become filled with multiple copies of the same content. Duplicate detection logic 406 may verify that the multiple sources carry the same content and may associate one downloaded copy of the content with the multiple sources (e.g., OCP user devices 110).

Duplicate detection logic 406 may use different procedures/processes to detect duplicates of the same content. Duplicate detection logic 406, for example, may compare filenames, sizes, and/or checksums of files. This process, however, may entail downloading a full copy of each file.

Duplicate detection logic 406 may also compare content, which is a candidate for downloading, to content from known mirror sites. Duplicate detection logic 406 may perform a domain name system (DNS) lookup of a name associated with content. When the DNS lookup identifies a Universal Resource Identifier (URI) or a name associated with a known mirror site, duplicate detection logic 406 may initiate a deeper analysis to determine if the content is already identified in the index database of index device 302 (e.g., determine if the content is already cached in content server device 306).

Duplicate detection logic 406 may also spot-check two files to determine if they correspond to the same content. When a downloading protocol or process permits (e.g., torrents), duplicate detection logic 406 may obtain file properties (e.g., checksum) and data at specific offsets of a first file being downloaded. Accordingly, when downloading the first file, duplicate detection logic 406 may compare the first file for the file properties for randomly selection portions at various points in the file to the file properties of a second file from another source (either already downloaded or being downloaded). If the file properties of the two files match or are sufficiently similar, the first file may be deemed identical to the second file.

Duplicate detection logic 406 may also perform "download-until-match." When content server device 306 receives requests for contents at multiple sources, content server devices 306 may initially attempt to honor each of the requests. When the downloads from the multiple sources to content server device 306 are in progress, duplicate detection logic 406 may compare a trailing download suspected of being a duplicate to a leading download, to determine whether checksums or data at various segments of the downloads match. If there is a match, duplicate detection logic 406 may provide redirects for CC user devices 112 receiving the trailing downloads, to the single copy of the content being downloaded or in cache if the first download has already completed by that point.

Request detection logic 408 may detect requests, from CC user device 112, for cached content in a number of ways. Request detection logic 408, for instance, may detect a request for con from a client application or a browser plug-in at CC user device 112 (e.g., client application installed by a user at CC user device 112). In these cases, the client application or the browser plug-in executing at user device 112 may send a request for content download to request detection logic 408.

When request detection logic 408 receives the request, request detection logic 408 may look up file location identifiers (e.g., Universal Resource Locator (URL), URI, filename, checksum, torrent seeds, etc.) that are associated with the content, in the index databases in index devices 302 of content server farm 202. When request detection logic 408 detects a match in the index database, request detection logic 408 may prompt (e.g., by sending a message to the client application or a plug-in at CC user device 112/114) a user with a popup, indicating that the user can download the media faster from content server farm 202. Optionally, if the user may selected "Always use fastest download" option in the client application/plug-in to avoid the popup, request detection logic 408 may automatically direct the client application/plug-in to storage locations in content server farm 202.

Request detection logic 408 may also receive notifications or messages, from monitoring device 314 (to be described below), that indicates monitoring device 314 has detected downloads of content/files of different types (e.g., .sio, .zip, .tar, .tgz, .rpm, etc.). Request detection logic 408 may match the detected/identified content/files against the indices (e.g., indices in the index database in index devices 302) in content server farm 202. If request detection logic 408 determines that there is a match (i.e., identifies the content/files), request detection logic 408 may instruct monitoring device 314 to inject an Hypertext Markup Language (HTML) tags in download pages for the content. The tags may indicate that there is a copy of the content/tile on content server farm 202 and that the copy on server farm 202 may be downloaded to CC use device 112/114 faster than the original on OCP user device 108/110. The user at CC user device 112/114 may respond to the tags (e.g., download the content from content server farm 202).

In the preceding scenario, if a user at CC user device 112/114 has selected "Always use fastest download" option at via a plug-in/client application or for the user account at host network 102, request detection logic 408 may send a redirect message to the CC user device 112/114. If OCP user device 108/110 has received the request from CC user device 112/114 for the original content, the redirect message from request detection logic 408 and data from the OCP user device 108/110 may be in a race condition. If the redirect message reaches the CC user device 112/114 before the data, CC user device 112/114 may be redirected to a copy of the content at content server farm 202.

Request detection logic 408 may also receive requests for content from content distribution application at partner network 106. When CC user device 112/114 accesses content distribution application, the content distribution application may check a source site to determine if content at the source site is mirrored at content server farm 202. If so, the content distribution application may provide a direct access to content server farm 202 before attempting to download the content from partner network 106.

In some cases, the content distribution application may direct request detection logic 408 to channel the majority of particular content to CC user devices 112/114. At the same time, the content distribution application may maintain the ability to stream supplemental content (e.g., regional or market based content or advertisement) from other devices in partner network 106. This may allow partner network 106 to collect locale-based content revenue. Alternatively, request detection logic 408 may provide for not only the majority of such content to CC user devices 112/114, but also the supplemental content (e.g., an advertisement).

Database 410 may include content or segments of content. Acquisition logic 404 may insert the content or content segments in database 410. Request detection logic 408 may retrieve content or content segments from database 410 and send the content or content segments to the requesting device/application (e.g., CC user device 112).

Returning to FIG. 3, user interface device 308 may include hardware and/or software communication protocols or programs for exchanging information with OCP user devices 108/1110 and CC user devices 112/114. In some embodiments of content server farm 202, user interface device 308 may be implemented as part of content server device 306.

User interface device 308 may, for example, receive hypertext transfer protocol (MIT) requests, file transfer protocol (FTP) requests, secure FTP (SFTP) requests, secure HTTP (HTTPS) requests, bit torrent requests, etc. in the case of bit torrent, content server farm 202 may be capable of providing dense seeding clusters for distribution of, for example, online games, programs, etc.

Figure 5:
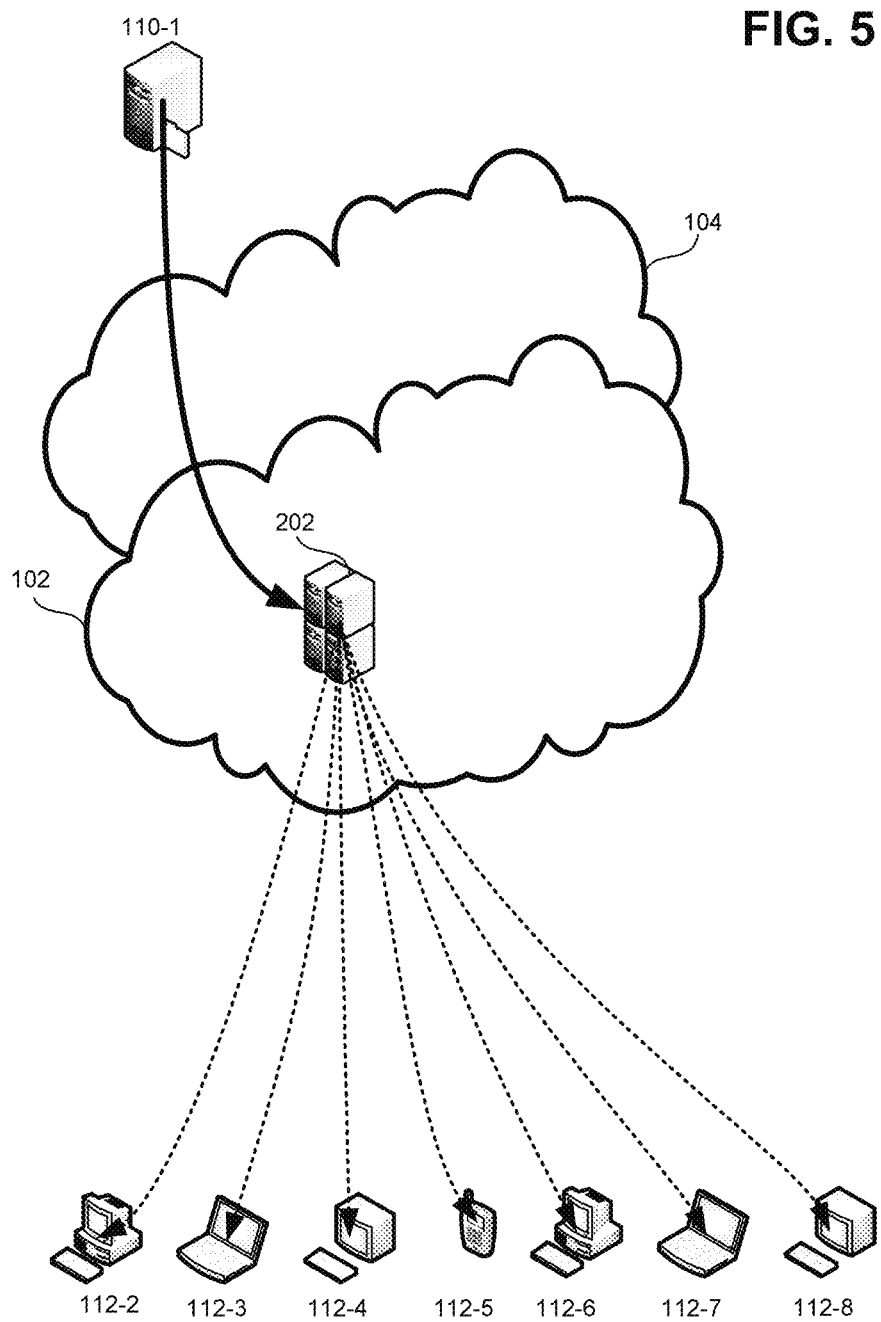
FIG. 5 illustrates distributing content via multicast/streaming.

User interface device 308 may allow CC user devices 112/114 to subscribe to a multicast or streamed content delivery method. User interface device 308 may allow such subscription for nearly any large recurring downloads. This may allow host network 102 to reduce overhead that is associated with conveying the data to a large user base. FIG. 5 illustrates distributing cached content via multicast/streaming. As shown, OCP user device 110-1 may upload a piece of content to content server farm 202. Content server farm 202 may multicast the piece of content to subscribers (e.g., CC user devices 112).

User interface device 308 may provide for multicast/streaming in different use-case scenarios. In one use-case scenario, user interface device 308 may provide for multicast/streaming when a content owner launches new content or releases updated content. In some instances, content owners may wish to host a staged/announced event and, at the end of the event, offer downloads such as video game, movies, movie trailers, OS releases, software applications, etc. When the content is launched or released, many simultaneous requests for the content may be expected, and content server farm 202 may significantly alleviate network or device bandwidth burdens.

In another use-case scenario, user interface device 308 may provide multicast/streaming when CC user device 112 requests linear content or live content. With linear content (i.e., broadcast television (TV) channel shows) or live events, multiple viewers may download and/or view the content at the same time via multicast/streaming.

In yet another user-case scenario, user interface device 308 may provide cyclic encoded content for time-shifted downloads, via multicast/streaming. For example, assume that content server farm 202 has cached a piece of content in multiple segments across content server devices 306 (e.g., tens or hundreds of content server devices 306). Each of the segments may be encoded (e.g., cyclic encoded). When user interface device 308 receives a request to retrieve the piece of content, user interface device 308 may consult the index database in index device 302 and locate the segments. Because the content is stored in segments, a viewer (e.g., CC user device 112) may playback any segment/chunk of the overall file.

User interface device 308 may provide for multicast in one of the following roles: active role, passive role, and management role. In the active role, user interface device 308 may act as an active peer-to-peer source, mirroring each peer-to-peer flow. In mirroring the peer-to-peer flows, user interface device 308 may use predictive algorithm based on use (e.g., number of streams and/or downloads).

In the passive role, user interface device 308 may act as a data source, but only upon being designated as a source in a path created by an active device. User interface device 308 may multicast to devices such as customer premise equipment, personal computer, smart device (e.g., mobile phone, smart television, smart Blu-ray, gaming console, WiFi hotspot, cars with WiFi-like technology, etc.), etc.

In some implementations, when content server device 306 caches content from an originating content provider, content server device 306 may generate a code that uniquely identifies the content. When applications or user devices in network 100 provides the code to user interface device 308 along with a request for the content, user interface device 308 may rapidly locate the content in content server farm 202, select a distribution method that best suits the applications or CC user devices 112/114, and distribute the content.

In general, when user interface device 308 receives a request to download content from content server farm 202, user interface device 308 may either provide a series of redirects for segments of the content or stream individual pieces from content server devices 306 to CC user devices 112/114.

Collection devices 310 may provide for high-speed data transfer from Bit Torrents, white feeding a common copy of content/files to CC user devices 112 for fast downloads, CC user devices of partner network 106 or another network may benefit when collection devices 310 seed a cluster from which the non-host network CC user devices download content.

Partner interface device 312 may provide functionalities that are similar to those of user interface device 308. However, in contrast to user interface device 308, partner interface device 312 may accept requests from partner devices. In some implementations, content server farm 202 may not chide partner interface device 312, and the partner devices may send request to user interface device 308 or content server device 306.

Monitoring device 314 may monitor on-the-wire DNS messages and web traffic. When monitoring device 314 detects commonly downloaded files types of notable size (e.g., .iso, .zip, tar, .tgz, rpm, . . . ), monitoring device 314 may send a message to content server device 306, indicating the detection. In some implementations, monitoring device 314 may inject HTML tags in download pages for content (e.g., after consulting index device 302) or upon receipt of instructions from content server device 306.

Figure 6:
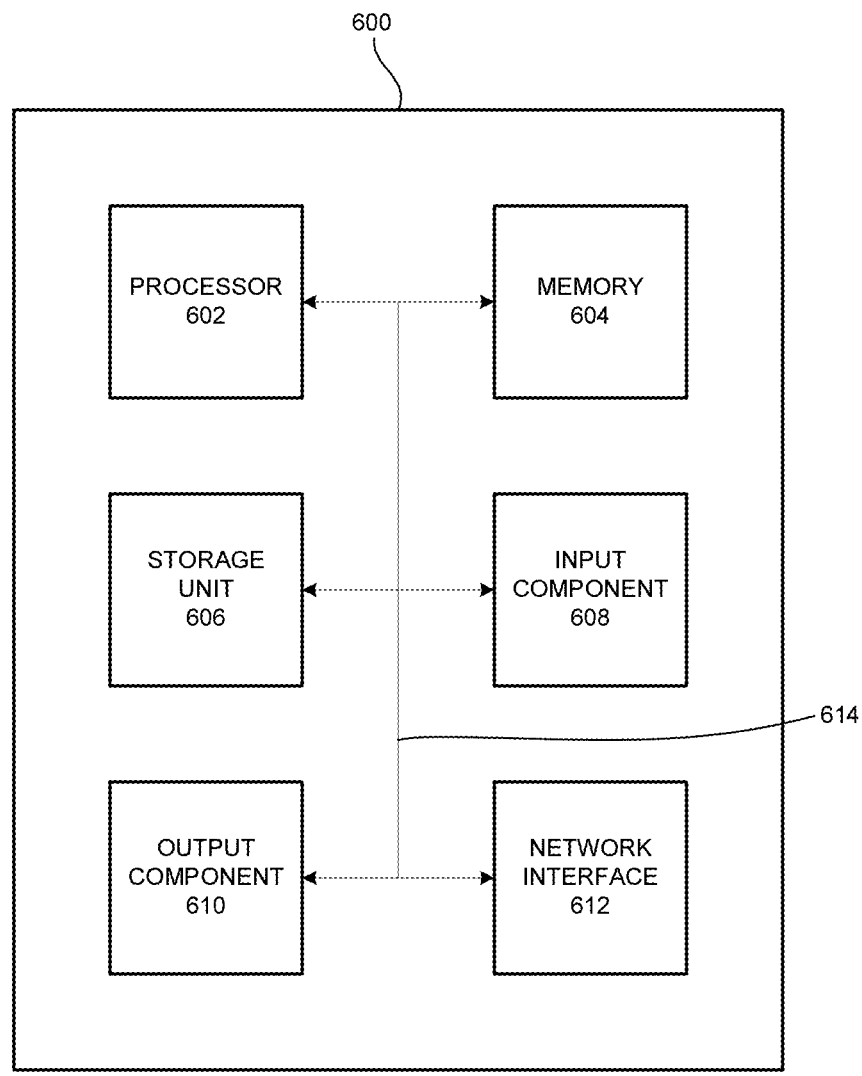
FIG. 6 is a block diagram of exemplary components of a network device.

FIG. 6 is a block diagram of exemplary components of a network device 600. Network device may correspond to any of the devices illustrated in FIG. 2, FIG. 3 and/or other devices described herein though not shown on a diagram (e.g. a "partner device" as mentioned above). As shown, device 600 may include a processor 602, memory 604, storage unit 606, input component 608, output component 610, network interface 612, and communication path 614. In different implementations, device 600 may include additional, fewer, different, or different arrangement of components than the ones illustrated in FIG. 6. For example, device 300 may include line cards for connecting to external buses.

Processor 602 may include a processor, a microprocessor, an Application Specific Integrated Circuit (ASIC), a Field Programmable Gate Array (FPGA), and/or other processing logic (e.g., embedded devices) capable of controlling device 600. Memory 604 may include static memory, such as read only memory (RUM), and/or dynamic memory, such as random access memory (RAM), or onboard cache, for storing data and machine-readable instructions (e.g., programs, scripts, etc.). Storage unit 606 may include a floppy disk, CD ROM, CD read/write (R/W) disc, holographic versatile disc (HVD), digital versatile disc (DVD), and/or flash memory, as well as other types of storage devices (e.g., hard disk drive) for storing data and/or machine-readable instructions (e.g., a program, script, etc.).

Input component 608 and output component 610 may provide input and output from/to a user to/from device 600. Input/output components 608 and 610 may include a display screen, a keyboard, a mouse, a speaker, a microphone, a camera, a DVD reader, Universal Serial Bus (USB) lines, and/or other types of components for converting physical events or phenomena to and/or from signals that pertain to device 600.

Network interface 612 may include a transceiver (e.g., a transceiver and a receiver) for device 600 to communicate with other devices and/or systems. For example, via network interface 612, device 600 may communicate over a network, such as the Internet, an intranet, a terrestrial wireless network (e.g., a WLAN, WiFi, WiMax, etc.), a satellite-based network, optical network, etc. Network interface 612 may include a modem, an Ethernet interface to a LAN, and/or an interface/connection for connecting device 600 to other devices (e.g., a Bluetooth interface).

Communication path 614 may provide an interface through which components of device 600 can communicate with one another.

Figure 7:
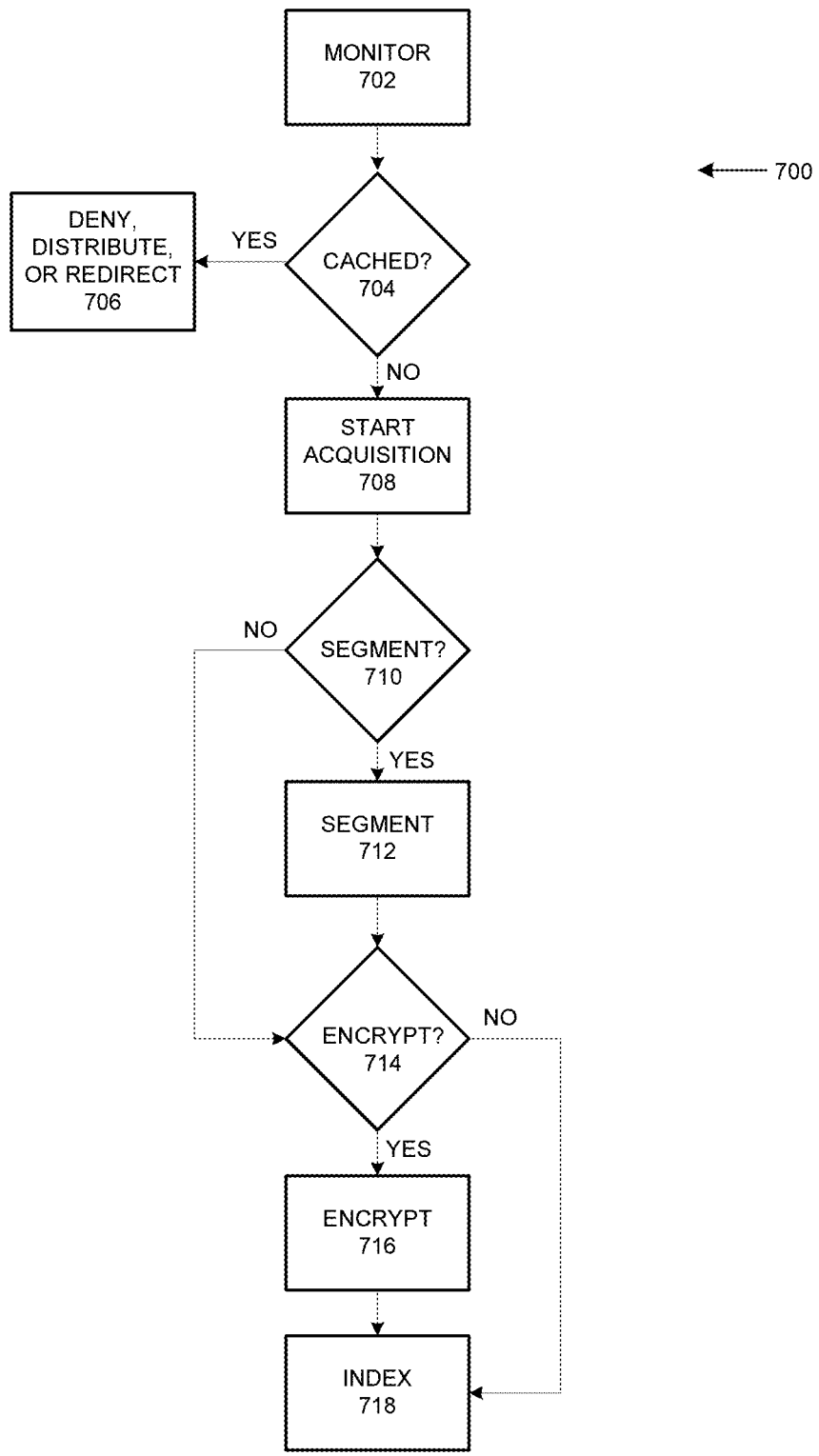
FIG. 7 is a flow diagram of an exemplary process that is associated with the content server farm of FIG. 2.

FIG. 7 is a flow diagram of an exemplary process 700 that is associated content server farm 202. Assume that content server farm 202 has cached a selected set of content. As shown, process 700 may include devices in content server farm 202 (e.g., content server device 306, user interface device 308, etc.) monitoring incoming messages (e.g., a request from a partner application, OCP user device 108/110, CC user device 112/114, etc.) for requests to upload content or download content from content server farm 202 (block 702). Process 700 may also include monitoring DNS traffic, web traffic, and/or other types of data traffic via monitoring devices 314 (block 702). When monitoring device 314 detects, based on the monitored network traffic, that CC user device 112/114 is to download content from OCP user device 108/110, monitoring device 314 may send a message to content server farm 202 (e.g., to notify content server device 306 or query index device 302 about the monitored data).

Based on the request from user device 108, 110, 112, or 114, or a message from monitoring device 314, content server farm 202 may determine whether the content that is to be uploaded or downloaded by the user device is already cached at one or more content server devices 306 (block 704). If the user device has requested the content to be uploaded but the content is a duplicate of the content already cached at content server device 306 (block 704: yes), content server farm 202 may deny the request to upload the content. Content server farm 202 may determine whether the content to be uploaded is a duplicate of content already cached at content server farm 202 based on one or more techniques described above (e.g., the techniques implemented by duplicate detection logic 406) (block 706).

If the user device has requested the content to be downloaded and the content already cached at content server device 306 (block 704: yes), content server farm 202 may distribute the content, in accordance with techniques described above, such as mutt cast, Bit Torrent, etc. (block 706).

If the message is from monitoring device 314 indicating that CC user device 112/114 is about to or attempting to download content, and the content-to-be downloaded is already cached (block 704: yes), then content server farm 202 may redirect CC user device 112/114 to appropriate links in content server farm 202 (e.g., via HTML tag injection to download page) (block 706). In some situations, this may create a race condition between OCP user device 118/110 that receives requests for content from CC user device 112/114 and content server farm 202.

If the user device has requested the content to be uploaded but the content is not cached at content server device 306 (block 704: no); or if the message is from monitoring device 314 indicating that CC user device 112/114 is about to or attempting to download content, and the content-to-be downloaded is not cached (block 704: no); content server farm 202 may start the content acquisition process (block 708), for example, via acquisition logic 404.

During the acquisition, content server farm 202 may determine whether the content that is to be acquired or cached is to be segmented (block 710). To determine whether the content is to be segmented, content server farm 202 may determine whether a user account associated with OCP user device 108/110, cookies that are associated with OCP user device 108/110, messages from a application/plug-in OCP user device 108/110, etc. indicate the content is to be segmented (e.v., via a segmentation flag). If so (block 710: yes), content server farm 202 may segment the content over multiple devices (e.g., content server devices 306) (block 712). Otherwise (block 710: no), process 700 may proceed to block 714. In an alternate implementation, decisions about whether the data should be segmented (block 710) may be made based on content server device 306 configuration, partner interface device 312 configuration, index device 302 configuration, user interface device 308 option selection or other means (e.g. default policy).

At block 714, content server farm 202 may determine whether a piece of content (e.g., each of the segments as a result of performing block 710 or the whole content) is to be encrypted, via a method similar to those described above for determining whether the content is to be segmented. If the content is to be encrypted (block 714: yes), content server farm 202 may encrypt the content either each of the segments or the whole content) (block 716). Otherwise (block 714: no), process 700 may proceed to block 718.

At block 718, content server farm 202 may generate indices for the content or segments of content, depending on the storage locations of the segments or the content. The segments may be stored at a single device, multiple devices, single database, etc. Once the indices are generated; content server farm 202 may populate the index databases, with the generated indices, in each index servers 302 in content server farm 202.

As described above, content server farm 202 may cache content that passes through one or more networks (e.g., host network 102 and partner network 106). By caching the content and providing the content upon demand, content server farm 202 may reduce the overall network traffic and relieve stress on network elements.

In this specification, various preferred embodiments have been described with reference to the accompanying drawings. It wilt, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, in some implementations, content server farm 202 may determine per click/download/view tokens for each piece of content accessed by CC user devices 112/114. Furthermore, content server farm 202 may provide information about the tokens to partnered originating content, providers, to help the partnered originating content providers track different download metrics. Alternatively, content server farm 202 may provide periodic reporting.

In another example, in some implementations, devices or components of content server farm 202 may provide customers (e.g., OCP user devices 108 and 110, CC user devices 112 and 114, partner devices, etc.) with the ability to opt-out or opt-in from content server farm 202 services. In one implementation; the customers may opt-out via cookies, via changing customer profile in an account, via client applications/plug-in, etc.

In yet another example, in some implementations, content server farm 202 may provide for content protection. When acting on behalf of other parties to distribute data that may need to be handled securely (e.g., online game services), content server farm 202 may provide some form of authentication (e.g., signed nonce, OpenAuth, proxy authentication, cookie, etc.) to prevent unauthorized downloads. Alternatively, content server farm 202 may cache already encrypted content. In such cases, the content owner would be responsible for providing legitimate users with keys as well as links to cached content on content server farm 202. In an alternate implementation, the partner providing the content may select specific access methods (e.g. HTTP, HTTPS, multicast, etc.) which are either permitted or forbidden for use with a piece of content.

In yet another example, in some implementations, content server farm 202 may allow users or partner to subscribe to caching services (e.g., for a monthly fee). Alternatively, content server farm 202 may offer one-time use option to the users (e.g., one-time use fee). In this scenario, the users' bandwidth caps are temporarily increased during a download from content server farm 202. This may be especially useful if the offer is provided for multicast stream of a frequently updated data source.

In still yet another example, in some implementations, when content server farm 202 stores or caches content, content server farm 202 may store attribution data (e.g., a statement that a piece of content is copyrighted by an entity) along with each file or segment. This may protect the operator or the owner of content server farm 202 against copyright infringement, for example. When a user device downloads the content via HTTP or FTP, content server farm 202 may embed the attribution data in the form of comments. On landing pages for individual content items, content server farm 202 may provide a list of source URLs/seeds and/or attribution data. Accordingly, from a copyright perspective, content server farm 202 may appear as a proxy for accelerating data download.

In the above, while a series of blocks have been described with regard to the process illustrated in FIG. 7, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code it being understood that software and control hardware can be designed to implement the aspects based on the description herein.

No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. One or more devices in a host network, the one or more devices configured to:
  receive a message indicating that first content is to be downloaded to a content consumer device in the host network different from a partner network;
  assign a confidence rating to the content consumer device, relative to other content consumer devices in the host network, wherein the confidence rating is assigned based on a history of content requests received from the content consumer device and the other content consumer devices;
  define, based on the assigned confidence rating, a request pattern with respect to the content consumer device and the first content;
  identify, based on the request pattern, second content associated with the first content, wherein a first copy of the first and second content is stored at an originating content provider device in the partner network and wherein a path for downloading the first copy of the first and second content from the originating content provider device in the partner network to the content consumer device in the host network includes peering points that connect the host network to the partner network;
  determine whether a second copy of the first and second content is cached at the one or more devices in the host network;
  acquire the first and second content when the second copy of the first and second content is not cached at the one or more devices in the host network;
  cache the first and second content as the second copy at one or more locations in the one or more devices in the host network;
  generate indices that correspond to the second copy of the first and second content and the locations at which the second copy of the first and second content is stored;
  store the generated indices in an index database of an index device of a plurality of index devices, wherein each index device is different from the content consumer device, and wherein the index database stores other indices of all content cached at the one or more devices in the host network; and
  transmit the generated indices to the other index devices, of the plurality of index devices, so that the index databases of all of the index devices, of the plurality of index devices, are synchronized.

2. The one or more devices of claim 1, wherein the one or more devices include the plurality of index devices.

3. The one or more devices of claim 1, wherein the message includes one of:
   a request from the content consumer device to download the second copy; or
   an alert message from a monitoring device, the alert message indicating that the content consumer device is attempting to download the first copy stored at the originating content provider device over the peering points.

4. The one or more devices of claim 3, comprising:
   the monitoring device configured to generate the alert message upon detecting a network message whose source is the content consumer device and whose destination is the originating content provider device.

5. The one or more devices of claim 1, wherein when the one or more devices determine whether the second copy of the first and second content is cached at the one or more devices, the one or more devices are configured to:
   compare a file property of the first and second content to be downloaded to file properties of contents cached at the one or more devices;
   compare the first and second content to be downloaded at specific offsets to second content; or
   download the first and second content to be downloaded until the first and second content to be downloaded is confirmed to match another content being downloaded.

6. The one or more devices of claim 1, wherein the second copy includes two or more segments that are stored over two or more devices included in the one or more devices or stored over two or more records in a database.

7. The one or more devices of claim 6, wherein when the one or more devices generate the indices, the one or more devices generate codes for a network device that is not included in the host network to provide to the one or more devices to locate the segments in the one or more devices.

8. The one or more devices of claim 1, wherein when the one or more devices acquire the first and second content, the one or more devices are configured to:
   join a peer-to-peer cluster.

9. The one or more devices of claim 1, wherein when the second copy of the first and second content is cached at the one or more devices, the one or more devices are further configured to:
   distribute the second copy via multicast;
   seed a bit torrent cluster with the second copy; or
   redirect the content consumer device to the second copy in the one or more devices in the host network.

10. The one or more devices of claim 1, comprising:
    a verification device configured to determine whether the second copy is stale by comparing samples or checksums of the second copy to samples or checksums of the first copy.

11. The one or more devices of claim 10, wherein the verification device is further configured to hide the second copy from devices not included in the host network when an expiration date for allowing the second copy to be downloaded has expired.

12. The one or more devices of claim 1, further configured to:
    select contents to cache at the one or more devices based on a size of each of the contents and frequency of network downloads for each of the contents.

13. The one or more devices of claim 1, further configured to:
    download and cache contents from a list of content distribution sites.

14. A method comprising:
    receiving a request to store, at a content server farm, a first copy of content from an originating content provider device in a partner network, and to provide the content to a content consumer device in a host network different from the partner network, wherein a path for downloading the first copy of the content from the originating content provider device in the partner network to the content consumer device in the host network includes peering points that connect the host network to the partner network;
    determining whether a second copy of the content is stored at the content server farm;
    acquiring the content when the second copy of the content is not stored at the content server farm;
    determining at least one of a state of limited storage space or a scheduling conflict with respect to pending content storage requests associated with one or more devices in the content server farm in the host network;
    determining that a confidence rating assigned to the content consumer device is higher than at least one other confidence rating assigned to another content consumer device in the host network associated with a pending content storage request;
    storing, irrespective of the pending content storage request based on the higher confidence rating, the content as the second copy at one or more locations in the one or more devices in the content server farm in the host network;
    generating indices that correspond to the second copy of the content and the locations at which the second copy of the content is stored;
    storing the generated indices in a database of an index device of a plurality of index devices of the content server farm, wherein each index device is different from the content consumer device, and wherein the database stores other indices of all content stored at the one or more devices in the content server farm; and
    transmitting the indices to the other index devices, of the plurality of index devices, so that the databases of all of the index devices, of the plurality of index devices, are synchronized.

15. The method of claim 14, wherein the content server farm includes the plurality of index devices.

16. The method of claim 14, wherein the determining whether the second copy of the content is stored at the content server farm includes:
    comparing a file property of the first copy to a file property of second content;
    comparing the first copy at specific offsets to second content; or
    download the first copy until the first copy matches a copy of second content.

17. The method of claim 14, wherein acquiring the content includes:
    determining whether the first copy of the content from the originating content provider device is to be stored, at the content server farm, in segments;
    downloading the first copy;
    segmenting the downloading copy into multiple segments when the first copy of the content is to be stored in segments; and
    storing the multiple segments in one or more devices in the content server farm.

18. The method of claim 14, further comprising at least one of:
    distributing the second copy via multicast; or
    seeding a bit torrent cluster with the second copy.

19. The method of claim 14, further comprising:
verifying whether the second copy is stale by comparing samples or checksums of the second copy to samples or checksums of the first copy.

20. A non-transitory computer-readable medium, comprising computer-executable instructions, for causing one or more processors executing the computer-executable instructions to:
receive a message indicating that first content is to be downloaded to a content consumer device in a host network different from a partner network;
assign a confidence rating to the content consumer device, relative to other content consumer devices in the host network, wherein the confidence rating is assigned based on a history of content requests received from the content consumer device and the other content consumer devices;
define, based on the assigned confidence rating, a request pattern with respect to the content consumer device and the first content;
identify, based on the request pattern, second content associated with the first content, wherein a first copy of the first and second content is stored at an originating content provider device in the partner network and wherein a path for downloading the first copy of the first and second content from the originating content provider device in the partner network to the content consumer device in the host network includes peering points that connect the host network to the partner network;
determine whether a second copy of the first and second content is cached at a network device that includes the one or more processors;
determine at least one of a state of limited storage space or a scheduling conflict with respect to pending content storage requests associated with one or more devices in the content server farm in the host network;
determine that the assigned confidence rating is higher than at least one other confidence rating assigned to one of the other content consumer devices associated with a pending content storage request;
download, irrespective of the pending content storage request based on the higher confidence rating, the first and second content from the device to the network device when the second copy of the first and second content is not cached at the network device;
cache the first and second content as the second copy at one or more locations in the network device in the host network;
generate indices that correspond to the second copy of the content and the locations at which the second copy of the first and second content is stored;
store the generated indices in a database of an index device of a plurality of index devices, wherein each index device is different from the content consumer device, and wherein the database stores other indices of all content cached at the network device; and
transmit the indices to the other index devices, of the plurality of index devices, so that the databases of all of the index devices, of the plurality of index devices, are synchronized.

* * * * *